United States Patent [19]
Rosen et al.

[11] Patent Number: 5,627,817
[45] Date of Patent: May 6, 1997

[54] OPTICAL DISK DATA STORAGE SYSTEM WITH MULTIPLE WRITE-ONCE DYE-BASED DATA LAYERS

[75] Inventors: Hal J. Rosen, Los Gatos; Kurt A. Rubin, Santa Clara; Wade W.-C. Tang, San Jose, all of Calif.

[73] Assignee: International Business Machines Corporation, Armonk, N.Y.

[21] Appl. No.: 435,069

[22] Filed: May 8, 1995

[51] Int. Cl.⁶ .................................................. G11B 7/00
[52] U.S. Cl. .......................... 369/58; 369/275.1; 369/283; 369/284; 369/100
[58] Field of Search ................... 369/275.1, 275.4, 369/275.5, 283, 284, 286, 93, 94, 100, 54, 58, 47

[56] References Cited

U.S. PATENT DOCUMENTS

| | | | |
|---|---|---|---|
| 4,090,031 | 5/1978 | Russell | 358/130 |
| 4,450,553 | 5/1984 | Holster et al. | 369/94 X |
| 4,639,745 | 1/1987 | Matsui et al. | 346/135.1 |
| 5,097,464 | 3/1992 | Nishiuchi et al. | 369/112 |
| 5,202,875 | 4/1993 | Rosen et al. | 369/94 |
| 5,260,165 | 11/1993 | Satou et al. | 430/271 |
| 5,263,011 | 11/1993 | Maeda et al. | 369/94 X |
| 5,373,499 | 12/1994 | Imaino et al. | 369/94 X |

FOREIGN PATENT DOCUMENTS

| | | | |
|---|---|---|---|
| 5-151616 | 6/1993 | Japan | G11B 7/24 |

OTHER PUBLICATIONS

Kurt A. Rubin et al., "Multilevel Volumetric Optical Storage", SPIE, vol. 2338, Optical Data Storage, 1994, pp. 247–253.

IBM News Release, "IBM Scientists Demonstrate Multi-level Optical Disks; Could Increase Optical Data Capacities 10–Fold or More", May 12, 1994.

*Primary Examiner*—Muhammad N. Edun
*Attorney, Agent, or Firm*—Thomas R. Berthold

[57] ABSTRACT

A multiple data layer dye-based optical disk drive uses a disk with a light transmissive substrate onto which the laser light at a single wavelength is incident. The disk substrate supports at least two spatially separated data layers formed of dye material. The disk is either an air-gap structure wherein each data layer is supported on a separate substrate and the substrates are separated by an air-gap, or a solid structure wherein a solid light transmissive spacer layer separates the data layers. The invention makes use of the characteristic anomalous dispersion absorption band of certain dye materials, in which at a specific wavelength the dye material exhibits a high index of refraction and low extinction coefficient. This allows the first data layer (the one nearest the incident laser light) and intermediate data layers to exhibit both sufficient absorption when the laser is focused on those data layers and high transmissivity when the laser is focused on the last or farther data layers. The index of refraction of the dye-based data layers is selected to be significantly greater than the adjacent substrate and spacer layer to enhance the reflectivity, and the thickness of the data layers is selected to take advantage of the constructive interference effect caused by the reflection at those interfaces. In one embodiment of the invention the dye material for the data layers is a mixture of two different dyes that are not chemically reactive with one another and that retain their individual optical properties. This dye-based data layer exhibits anomalous dispersion absorption at two distinct wavelengths, thereby allowing disks recorded at one wavelength to be read by optical disk drives that use lasers operating at a lower wavelength.

31 Claims, 8 Drawing Sheets

OPTICAL DISK DATA STORAGE SYSTEM WITH MULTIPLE WRITE-ONCE DYE-BASED DATA LAYERS

TECHNICAL FIELD

This invention relates generally to an optical disk data storage system and more specifically to such a system using a disk having multiple data layers

BACKGROUND OF THE INVENTION

Optical disk data storage systems allow the storage of large quantities of data on a disk. The data is accessed by focusing a laser beam onto the data layer of the disk and then detecting the reflected light beam.

In write-once read-many (WORM) systems, the laser writes data by making permanent marks on the data layer. Once the data is recorded onto the disk it cannot be erased. The data in a WORM system is detected as a change in reflectivity between written and non-written regions of the data layer.

In an ablative WORM system, the laser writes data by melting portions of the data layer, resulting in physical pits in the data layer. In a phase-change WORM system phase-change alloys are used as the recording material and the laser writes data by locally converting the phase-change data layer from one structural phase (e.g., amorphous) to a second structural phase (e.g., crystalline). This is done when the amorphous region is heated and maintained at or above its crystallization temperature, or alternatively melted and slowly cooled until the region is crystallized. The WORM function is achieved because the medium is designed so that the second structural phase does not convert back easily to the first structural phase.

In contrast to ablative and phase-change systems, another type of WORM system uses an organic dye-based data layer. The dyes are defined generally as organic compounds that have conjugated double bonds, and include materials from the dye families of cyanine, squarylium, phthalocyanine, azomethine, merocyanine, anthraquinone and phenylenediamine metal complexes. The marks are written in the dye-based data layer by heating a small region above the decomposition temperature of the dye to cause a local change in the optical properties of the material. The primary effect of the laser heating is a change in the index of refraction of the dye material, although in certain dye materials there may also be some ablation or deformation of the material. The result is that there is a change in reflected light intensity between the written and non-written regions of the dye-based data layer.

To increase the storage capacity of an optical disk, multiple data layer systems have been proposed. An optical disk having two or more data layers may be accessed at the different spatially separated data layers by changing the focal position of the lens. Examples of this approach are described in U.S. Pat. Nos. 5,202,875; 5,097,464; and 4,450, 553. One problem with using multiple data layers in dye-based WORM disks is that the conventional dye WORM materials are highly absorptive of light. Multiple data layer disks require that the intermediate data layers between the disk surface onto which the laser light is incident and the last or farthest data layer from that surface be light transmissive. Because the conventional dye-based WORM materials tend to absorb a high percentage of the light, it is not possible to write on the farther data layers. If the intermediate data layers are merely made thinner to make them transparent, they then lack sufficient reflectivity and/or signal contrast (the difference in reflectivity between the written and non-written regions) so that they fail to function as dye-based WORM data layers.

Multiple data layer dye-based optical disk systems have been proposed, as described, for example, in U.S. Pat. No. 4,090,031 and Japanese published patent application JP05-151616. However, in these systems each dye-based data layer is sensitive to light at a different wavelength. This requires that the different data layers be formed of different dye materials and that the optical drive include light filters or multiple laser sources to generate light at the different wavelengths.

IBM's co-pending application Ser. No. 08/167,714, filed Dec. 15, 1993, relates to a multiple data layer CD-ROM type optical disk wherein dye material is used in the reflective layers that are coated onto the embossed patterns of pits that form the CD-ROM data layers.

What is needed is a multiple data layer dye-based WORM optical disk system that provides a good signal from the data layers closer to the incident laser light, that allows writing with reasonable laser power on all data layers, and that is operable at a single laser wavelength so that the data layers can be formed of substantially the same dye material.

SUMMARY OF THE INVENTION

The invention is a multiple data layer dye-based optical disk and disk drive. The disk has a light transmissive substrate onto which the laser light at a single wavelength is incident. The substrate supports at least two spatially separated data layers formed of dye material. The disk is either an air-gap structure wherein each data layer is supported on a separate substrate and the substrates are separated by an air-gap, or a solid structure wherein a solid light transmissive spacer layer separates the data layers. The invention makes use of the characteristic anomalous dispersion absorption band of certain dye materials, in which at a specific wavelength the dye material exhibits a high index of refraction and low extinction coefficient. This allows the first data layer (the one nearest the incident laser light) and intermediate data layers to exhibit both sufficient absorption when the laser is focused on those data layers and high transmissivity when the laser is focused on the last or farther data layers. The index of refraction of the dye-based data layers is selected to be significantly greater than the adjacent substrate and spacer layer to enhance the reflectivity, and the thickness of the data layers is selected to take advantage of the constructive interference effect caused by the reflection at those interfaces. In one embodiment of the invention the dye material for the data layers is a mixture of two different dyes that are not chemically reactive with one another and that retain their individual optical properties. This dye-based data layer exhibits anomalous dispersion absorption at two distinct wavelengths, thereby allowing disks recorded at one wavelength to be read by optical disk drives that use lasers operating at a lower wavelength.

For a fuller understanding of the nature and advantages of the present invention, reference should be made to the following detailed description taken together with the accompanying drawings.

DESCRIPTION OF THE PREFERRED EMBODIMENTS

Figure 1:
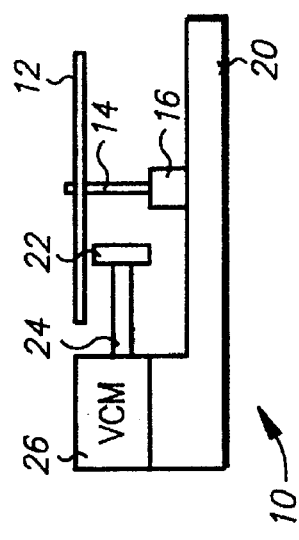
FIG. 1 is a schematic diagram of an optical disk drive system of the present invention with a multiple data layer dye-based optical disk.

FIG. 1 is a schematic diagram of an optical disk data storage system according to the present invention designated by the general reference number 10. System 10 includes an optical data storage disk 12 which is preferably removably mounted on a clamping spindle 14 as is known in the art. Spindle 14 is attached to a spindle motor 16, which in turn is attached to a system chassis 20. Motor 16 rotates spindle 14 and disk 12.

An optical head 22 is positioned below disk 12. Head 22 is attached to an arm 24, which in turn is connected to an actuator device such as a voice coil motor 26. Voice coil motor 26 is attached to chassis 20 and moves arm 24 and head 22 in a radial direction below disk 12.

Figure 2A:
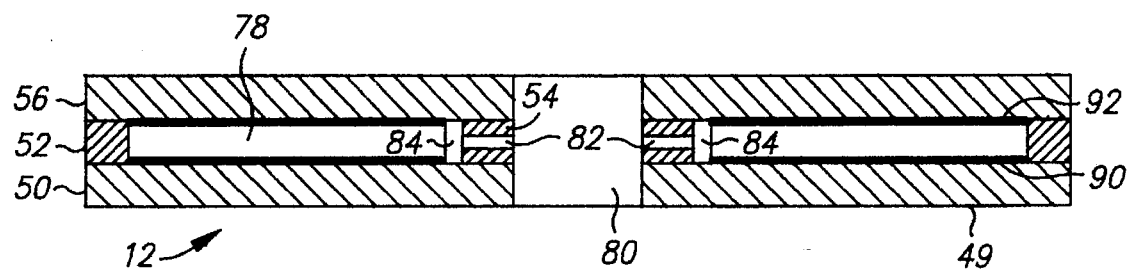
FIG. 2A is a cross-sectional view of an air-gap multiple data layer optical disk.

FIG. 2A is a cross-sectional view of disk 12. Disk 12 has a substrate 50 having an outer face 49 onto which the laser beam is incident. An outer diameter (OD) rim 52 and an inner diameter (ID) rim 54 are attached between face plate 50 and a second substrate 56. Substrate 50 may be made of a light transmissive material such as glass, polycarbonate or other polymer material. Substrate 56 may be made of a similar material to substrate 50 or may be made of a material that is not transmissive of light in embodiments where the light does not have to pass through the substrate 56. In a preferred embodiment, substrates 50 and 56 are 1.2 mm thick. Substrate 50 has a data layer 90 and substrate 56 has a data layer 92. Data layers 90, 92 each contain dye-based WORM material and are described in detail below. The substrates 50, 56 have optical tracking grooves or marks and/or header information formed into the surfaces adjacent to data layers 90, 92, respectively, by injection molding, a photo-polymer process or an embossing process. Alternatively, the tracking features may be pits formed in the substrates or recorded marks in the data layer. The OD and ID rims 52, 54 are preferably made of a plastic material and are approximately 500 microns thick. The rims 52, 54 may be attached to the substrates 50, 56 by glue, cement, ultrasonic bonding, solvent bonding, or other conventional bonding process. The rims 52, 54 may alternatively be integrally formed in the substrates 50, 56 during the substrate molding process. When in place, the rims 52, 54 form annular air-gaps or spaces 78 between the substrates 50, 56. A spindle aperture 80 passes through disk 12 inside the ID rim 54 for receiving the spindle 14. A plurality of passages 82 are provided in the ID rim 54 connecting the aperture 80 and the spaces 78 to allow pressure equalization between the spaces 78 and the surrounding environment of the disk drive. A plurality of low impedance filters 84 are attached to passages 82 to prevent contamination of spaces 78 by particulate matter in the air. Filters 84 may be quartz or glass fiber. Passages 82 and filters 84 could alternatively be located on the OD rim 52.

Figure 3:
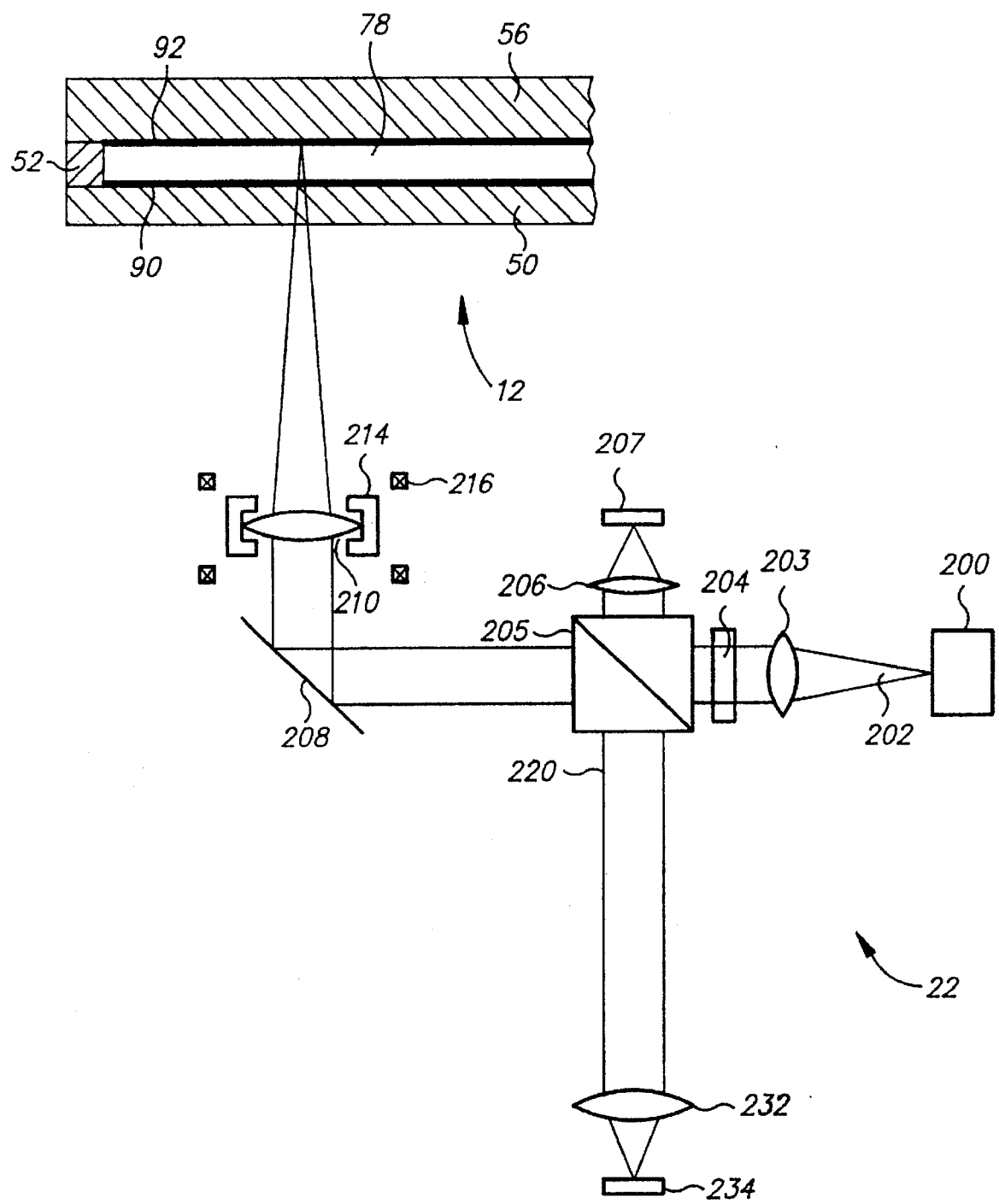
FIG. 3 is a schematic diagram of the optical head and optical disk, in the form of a two data layer air-gap structure, of the optical disk drive system.

FIG. 3 shows a schematic diagram of one embodiment of the optical head 22 and disk 12. Optical head 22 includes a laser diode 200, which may be a gallium-aluminum-arsenide diode laser producing a primary beam of light 202 at a fixed wavelength. Laser diode 200 is capable of operating at two power levels, i.e., a first write power level that is high enough to change the index of refraction of the dye-based material in the data layers and a second lower read power level for reading the data by reflection from the written and non-written regions in the data layers. Beam 202 is collimated by lens 203, then circularized by circularizer 204. Beam 202 then passes to a beamsplitter 205. A portion of beam 202 is reflected by beamsplitter 205 to a lens 206 and an optical detector 207. Detector 207 is used to monitor the power of laser beam 202. Beam 202 from beamsplitter 205 next passes to and is reflected by a mirror 208. Beam 202 then passes through a focus lens 210 and is focused to a diffraction-limited spot onto one of the data layers 90, 92. Lens 210 is mounted in a holder 214, the position of which is adjusted relative to disk 12 by a focus actuator motor 216, which may be a voice coil motor. Movement of the lens 210 by the focus actuator motor 216 moves the focused spot between the two data layers 90, 92 on the substrates 50, 56 of disk 12. A portion of the light beam 202 is reflected from a data layer 90, 92 as a reflected beam 220. Beam 220 returns through lens 210 and is reflected by mirror 208. At beamsplitter 205, beam 220 is directed through an astigmatic lens 232 and onto a multielement optical detector 234.

Figure 4:
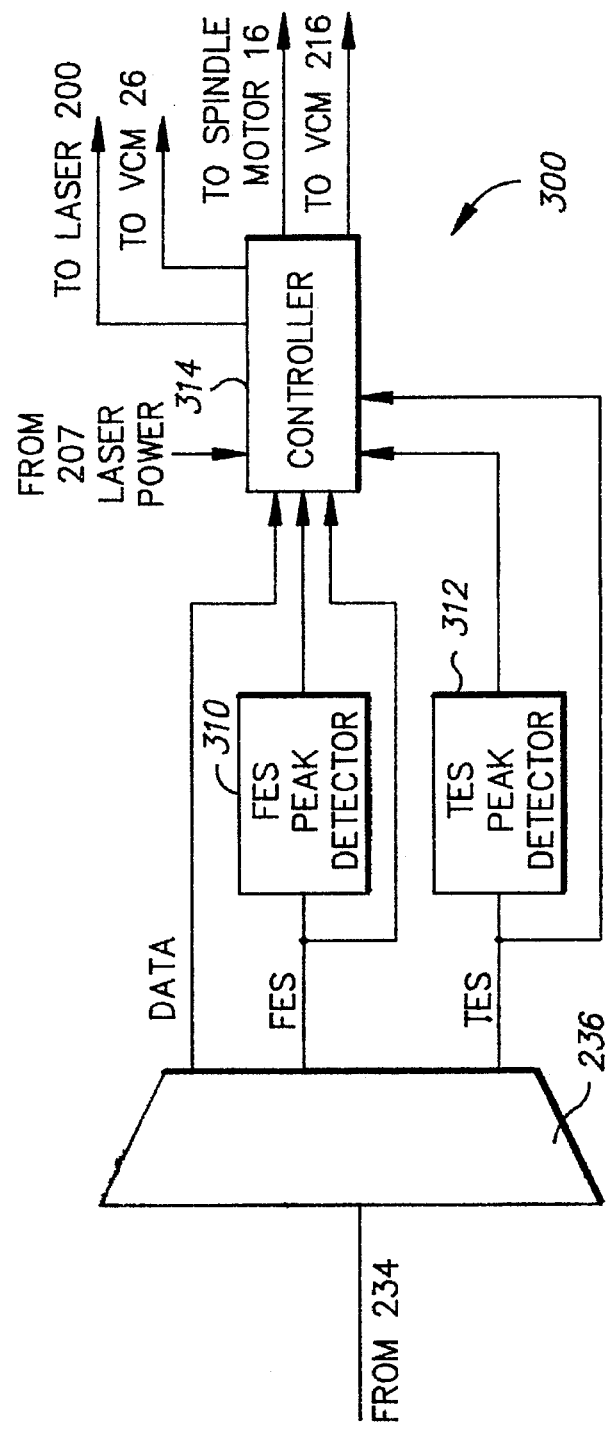
FIG. 4 is a block diagram of a controller system of the optical disk drive system.

FIG. 4 is a block diagram of a controller system of the optical disk drive system and is designated by the general reference number 300. The multielement detector 234 (FIG. 3) generates output signals that provide a data signal, a focus error signal (FES), and a tracking error signal (TES). These signals are amplified by signal amplifier 236 and sent directly to controller 314. A peak detector 310 also receives the FES, and a peak detector 312 also receives the TES from amplifier 236. Controller 314 also receives input signals from FES peak detector 310, TES peak detector 312, and laser power detector 207. Controller 314 is a microprocessor-based disk drive controller. Controller 314 is also connected to and controls the laser 200, head motor 26, spindle motor 16, and focus actuator motor 216.

Figure 2B:
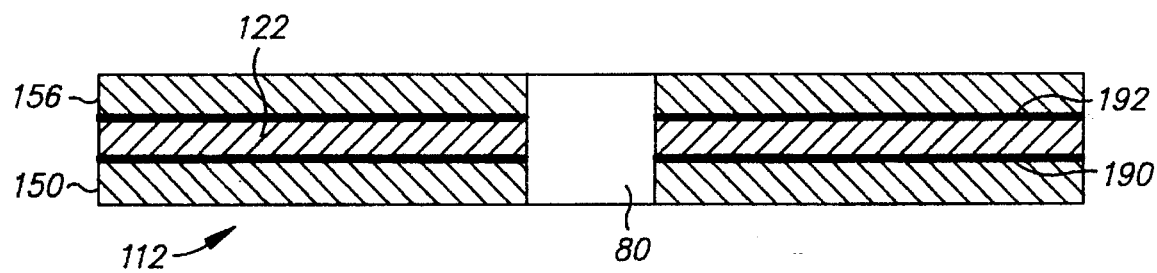
FIG. 2B is a cross-sectional view of a dual substrate laminated multiple data layer optical disk.

FIG. 2B is a cross-sectional view of an alternative embodiment of a highly transmissive optical recording disk 112 that may be substituted for disk 12 in system 10. Elements of disk 112 are similar to elements of disk 12 in FIG. 2A, but disk 112 does not have the rims and spacers of disk 12. Instead, a solid transparent spacer 122 separates the substrates 150 and 156. In a preferred embodiment, the spacer 122 is made of a highly transmissive optical cement which also serves to hold the substrates 150 and 156 together. The thickness of spacer 122 is preferably approximately 20–300 microns. The data layers 190, 192 on respective substrates 150, 156 contain the dye-based WORM material.

Figure 2C:
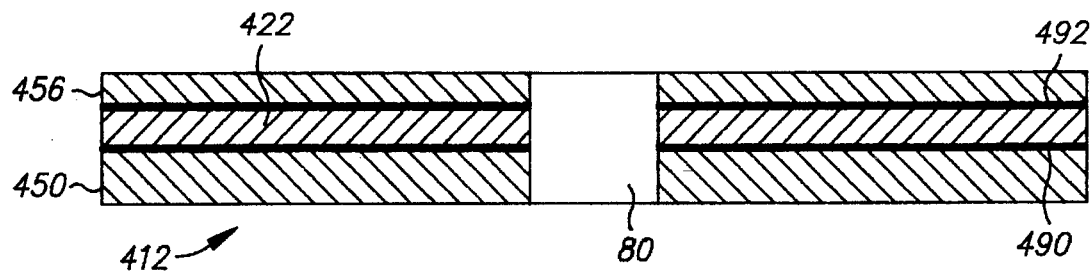
FIG. 2C is a cross-sectional view of a single substrate laminated multiple data layer optical disk.

FIG. 2C is a cross-sectional view of another alternative embodiment of a highly transmissive optical recording disk 412 that may be substituted for disk 12 in system 10. Elements of disk 412 are similar to elements of disk 112 in FIG. 2B. However, disk 412 does not use two separate substrates as in the previous embodiments (e.g., substrates 150, 156 in FIG. 2B), but instead builds a multilayer structure from a single substrate 450. The dye-based WORM data layers 490, 492 are separated by a solid spacer layer 422. Spacer layer 422 is a dielectric light transmissive layer formed by either lamination or deposition (such as photopolymer process or spin-coating) over data layer 490 on substrate 450. In a preferred embodiment, the light transmissive spacer layer 422 is made of a polymer material such as polycarbonate. The top surface of layer 422 has tracking grooves and/or header information formed into its surface by either a photo-polymer process or embossing. The second dye-based WORM data layer 492 is then deposited on top of spacer layer 422. A final protective layer 456 of polymer material, such as polycarbonate with an adhesive coating or ultraviolet (UV) curable spin-coated acrylate, is then deposited onto data surface 492.

Figure 2D:
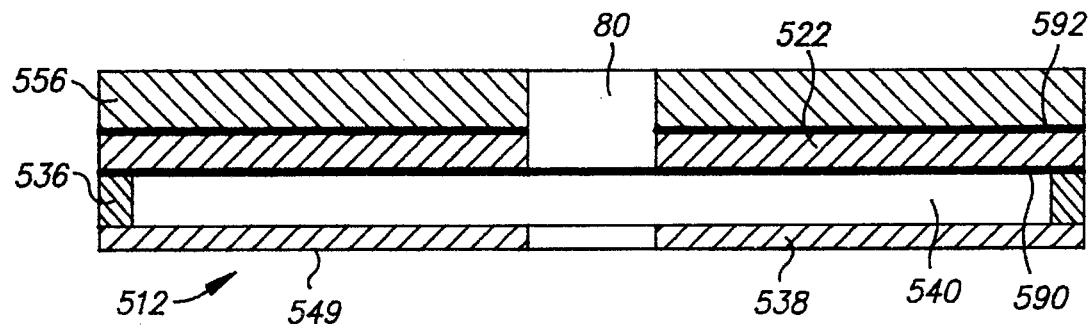
FIG. 2D is a cross-sectional view of a laminated multiple data layer optical disk with a protective dust cover serving as the substrate spaced from the first data layer by an air-gap.

FIG. 2D is a cross-sectional view of another alternative embodiment of a highly transmissive optical recording disk 512 that may be substituted for disk 12 in system 10. In this embodiment the disk 512 includes a solid disk blank 556. A WORM data layer 592 is deposited onto disk blank 556 and forms the second or farthest data layer from the incident laser light. A solid spacer layer 522 is formed over data layer 592 and the first dye-based WORM data layer 590 nearest to the incident laser light is formed on spacer layer 522. A plastic ring 536 is bonded to spacer layer 522 and extends around the outer perimeter of spacer layer 522. The ring 536 supports a transparent plastic dust cover 538. The dust cover 538 is typically 100 microns thick and is stretched across and bonded to ring 536. Dust cover 538 serves essentially as a substrate having an outer face 549 onto which the laser beam is incident. The dust cover 538 forms an air-gap 540 of 0.2–2.0 mm between it and the first data layer 590. The laser light is incident on the outer surface of dust cover 538. The disk blank 556 is preferably made of solid material with a smooth surface, such as an aluminum alloy. The spacer layer 522 is a spin-coated and cured photo-polymer film with a typical thickness of 0.05–0.15 mm. The dust cover 538 is made of a transparent polymer material such as polycarbonate.

The detailed description of the multiple dye-based WORM data layers and their method of fabrication will be described below with respect to the disk structure of FIG. 2A. However, the multiple dye-based WORM data layer system of the present invention is also operable with any of the other disk structures shown and described in FIGS. 2B–2D. For the solid structures of FIGS. 2B–2D a soft "giving" or deformable layer of material, such as a fluorinated hydrocarbon (e.g., plasma deposited Teflon®), may be deposited on top of each of the data layers between the data layers and the layers of solid spacer material. The purpose of this deformable layer is to undergo a deformation in response to heating of the dye material by the focused laser beam. This deformation is principally plastic but can be a mixture of plastic and elastic and allows the dye material to ablate and/or deform. This reduces the laser write power required during writing.

FIG. 2A is a cross-sectional view of the optical data storage disk 12 with multiple dye-based WORM data layers 90 and 92. Disk 12 has a substrate 50 having an outer face 49 onto which the laser beam is incident. Substrate 50 is preferably made of polycarbonate (index of refraction n=1.5), but can also be made of amorphous polyolefin (APO), polymethylmethacrylate (PMMA), or glass and is non-absorbing at the recording wavelength. Substrate 50 is preferred to have a thickness of 1.2 mm but other thicknesses can be used. The second data layer 92 is deposited on the second substrate 56. Substrate 56 can be formed of the same materials as substrate 50 or of opaque materials such as opaque plastic materials and metallic materials, such as aluminum.

In a multiple data layer optical disk system, the light transmissivity of the data layers closer to the incident laser light must be sufficiently high so that sufficient photons reach the farther data layers without the need for excessive laser power. The recording layer 90 is a spin-coated dye layer which has this sufficient level of transmissivity but also has sufficient reflectivity to allow reliable reading of data and sufficient absorption to allow writing of data with reasonable laser power. These conditions can be met when the index of refraction n is relatively high (n>1.6) and the extinction coefficient k (the imaginary part of the index of refraction) is in the range of approximately 0.01–1.0. The high index of refraction is required to maximize the reflection at the interfaces of the data layers to improve the readback signal. In the case of the embodiment of FIG. 2A where the substrate 50 is polycarbonate (with n=1.5) and an air-gap 78 (with n=1.0) is adjacent the data layer 90, the dye-based material should have an index of refraction at least as large as 1.7. The relatively low value of extinction coefficient is required to assure that when the light spot is focused on the second dye-based data layer 92 the light beam will transmit through the first data layer 90 with minimal absorption. The relationship between n, k and transmissivity, reflectivity and absorption can be calculated using standard thin film interference calculations, as described, for example, in *Optical Properties of Thin Solid Films*, O. H. Heavens, Academic Press, 1955.

Figure 5:
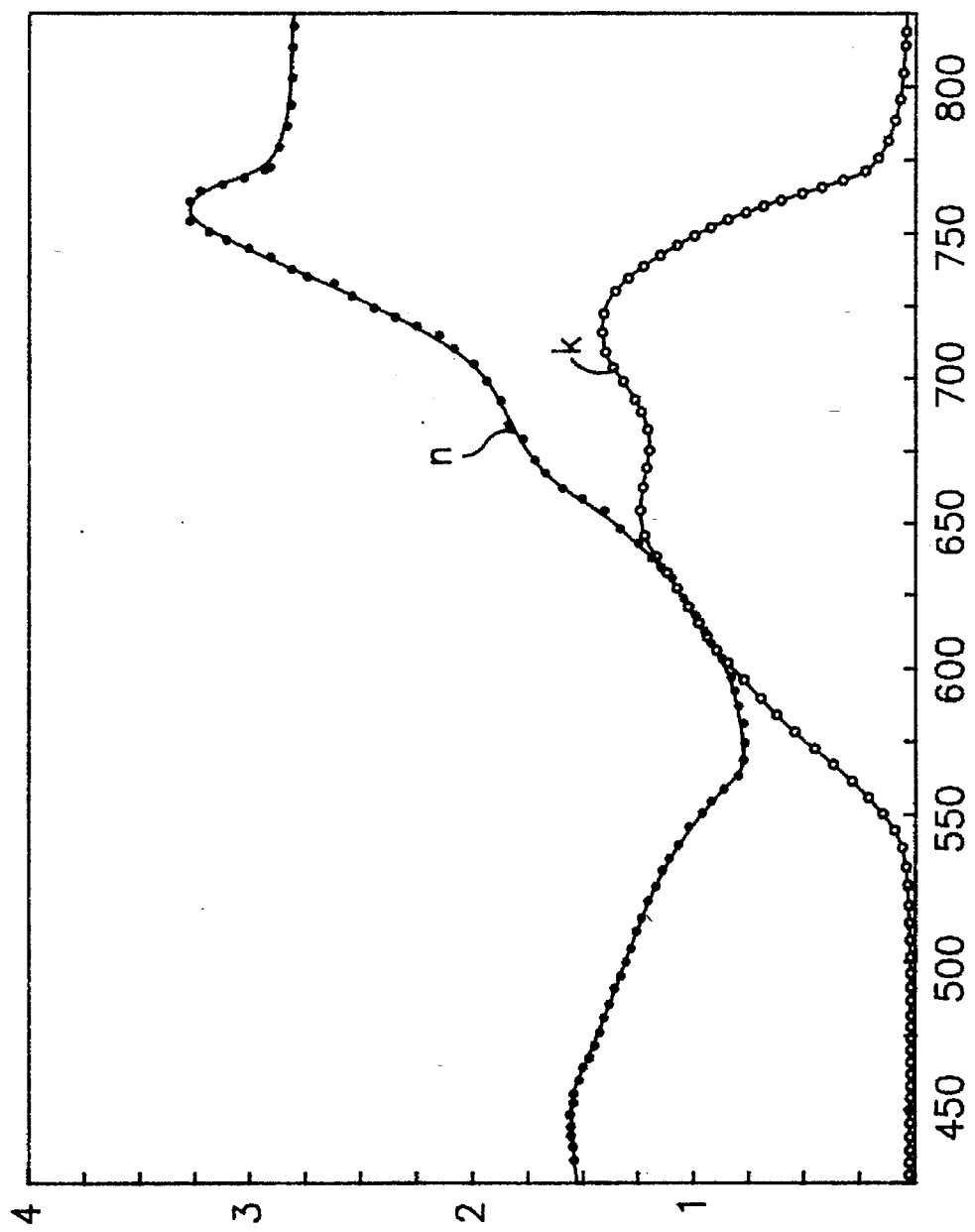
FIG. 5 is a graph of index of refraction (n) and extinction coefficient (k) versus wavelength for a cyanine dye material having an anomalous dispersion absorption band.

These conditions for n and k occur in certain dye-based materials over certain wavelength ranges. One wavelength range where these conditions are met is near the region of anomalous dispersion on the high wavelength (λ) absorption band edge of a dye material. Anomalous dispersion is generally defined to be the region where $dn/d\lambda$ is positive near a peak value and $dk/d\lambda$ is decreasing. A more detailed discussion of anomalous dispersion is given in *Principles Of Optics*, M. Born and E. Wolf, p. 93, Pergamon Press, 3rd Edition, 1964. Dye materials strongly exhibit this phenomenon. FIG. 5 is a graph of index of refraction n and extinction coefficient k versus wavelength for a cyanine dye with an anomalous dispersion absorption band. The anomalous dispersion absorption band in FIG. 5 is for wavelengths between approximately 720–760 nm. In the present invention, the wavelength region of interest for dye materials usable in the first and intermediate data layers is near or just beyond this anomalous dispersion absorption band, i.e., where n is near its peak value and k is decreasing rapidly to a relatively small value. In FIG. 5, this region occurs near 780 nm.

Dye materials are generally defined as organic compounds that have conjugated double bonds. Conjugated double bonds are formed when two double bonds are separated by a single bond. Some dye families that are usable for data layers 90, 92 are cyanine, squarylium, phthalocyanine, azomethine, merocyanine, anthraquinone and phenylenediamine metal complexes. Some specific examples of these dyes are as follows:

Cyanine family:
  Diethyloxa dicarbocyanine perchlorate, Diethylthiadicarbocyanine iodide, Dibutyl tetramethyl dibenzoindo dicarbocyanine perchlorate;
Squarylium family:
  Hydroxy squarlium;
Phthalocyanine Family:
  Copper phthalocyanine, Cobalt phthalocyanine;
Azomethine family:
  Diethylammonium chloride;
Merocyanine family:
  Ethyl ethylbenzothiazolidene-ethyl rhodanine;
Anthraquinone family:
  Tetra amino anthraquinone, Diethyl aminophenolphtalein hydrochloride;
Phenylenediamine metal complexes:
  Bis(benzenedithoil) copper.

A more detailed discussion of these dye materials is given in *Infrared Absorbing Dyes*, Masaru Matsuoka, Plenum Press, 1991.

To increase the stability of the thin dye layer, the dye solution before spin-coating can be mixed with metal complexes with benzene dithiol as the oxygen quencher. To increase the adhesion of the dye layer to the substrate the dye material may be contained in a solution mixture of dye and a polymer, such as PMMA, polystyrene, polyvinylacetate, or cellulose nitrate.

For a given laser wavelength the index of refraction of the dye material can be controlled by selecting an appropriate dye composition. In addition, the dyes can be mixed together to yield appropriate optical constants. They can also have small changes made to their chemical structure, such as by replacing the counter ion in a cyanine dye, or by adding dopants, such as a donor substituent in a phthalocyanine dye, to tune their wavelength dependence.

Figure 6:
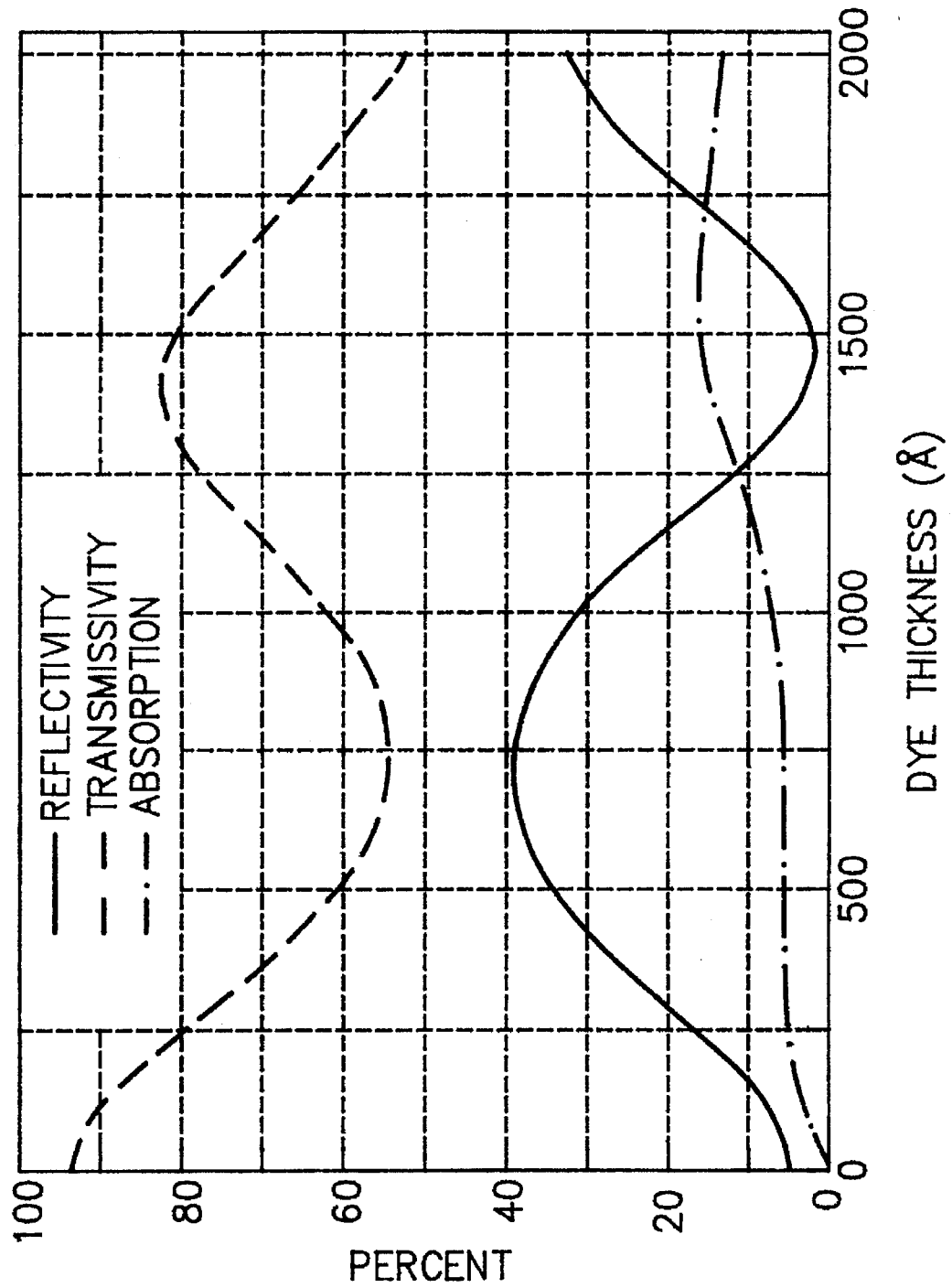
FIG. 6 is a graph of the transmissivity, reflectivity and absorption of a cyanine dye data layer as a function of thickness for a system where n=2.7, k=0.05 and the laser wavelength is 780 nm.

In the two data layer embodiment (FIG. 2A) a phthalocyanine dye (copper phthalocyanine tetracarboxamide) in a solvent of methoxy ethanol was spin-coated to a thickness in the range of 150–1250 Angstroms onto substrate 50 to form the first data layer 90. Before spin-coating the solution containing the dye material, a chemical buffer layer such as a nitride, oxide, carbide, sulfide or combination of such (e.g., $SiO_2$, $SiN_4$, ZnS, SiC) can be deposited on substrate 50 to increase the flexibility in the choice of solvents for the dye material. For example, since acetone is known to dissolve polycarbonate, a chemical buffer layer will allow acetone to be used as the solvent if the substrate is polycarbonate. In a preferred embodiment this specific phthalocyanine dye material has an index of refraction n=2.7 and an extinction coefficient k=0.05 at a wavelength of 780 nm. FIG. 6 shows the transmissivity, reflectivity and absorption of this dye material as a function of layer thickness, where the adjacent spacer material is air (n=1.0). These parameters show large sinusoidal variations due to interference effects as the thickness of the layer is varied. This is because the phase of propagating waves varies with the thickness of the layer. The interference between the beam reflected from the substrate/data layer interface and the beam reflected from the data layer/air interface will go through cycles of constructive and destructive interference as the thickness is varied. As can be seen from FIG. 6, for this dye material transmissivity greater than 50% and reflectivity greater than 10% are achieved with a dye thickness varying between approximately 150 and 1250 Angstroms. In one embodiment a dye thickness of 500 Angstroms was used for data layer 90, resulting in a transmissivity of 60%, a reflectivity of 34%, and an absorption of 6%. Such a dye-based data layer 90 has suitable optical characteristics for writing good marks with reasonable laser power and reading the marks with good signal-to-noise ratio.

Referring again to FIG. 2A, the second dye-based data layer 92 does not have to be transmissive but only reflective and sufficiently sensitive to be able to write with reasonable laser power when the incident laser light passes through first data layer 90. Data layer 92 may be formed of the same dye material as data layer 90. Many known dye materials can meet the requirements for data layer 92. In one embodiment a naphthalocyanine dye of 500 Angstroms thickness is used as data layer 92. This layer is spin-coated onto substrate 56. A spin-coated or sputtered protective layer of material such as $SiN_x$, ZnS, $ZrO_x$, $SiO_2$ or a UV curable photo-polymer may also be deposited on the data layers 90, 92.

In an alternative embodiment the thickness of the cyanine dye data layer 90 was chosen near 1000 Angstroms (±20%), where both the transmissivity and reflectivity are relatively high. In this embodiment the contrast of the marks is higher than the first embodiment because of the thicker film but the power required to write the marks is also higher since a larger volume of dye material must be heated to its critical temperature. This embodiment is preferable where high contrast marks are required, as for example in compact disc (CD) writable disks.

In a multiple data layer system with more than two data layers it is necessary for all the layers except the last layer to have high transmissivity. In general, as the number of data layers increases the transmissivity of each of the intermediate layers has to increase so that marks can be written with reasonable laser power on the farther data layers. However, as the transmissivity is increased substantial absorption must also be maintained so that the laser power to write on the individual layers is not too large.

Figure 7:
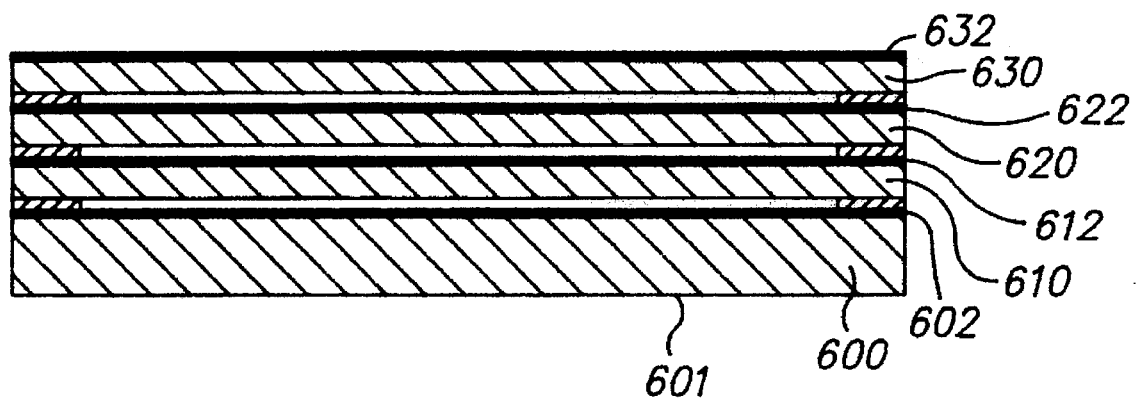
FIG. 7 is a cross-sectional view of a four data layer optical disk using a dye material having n=2.7 and k=0.15 on the first and intermediate data layers.
Figure 8:
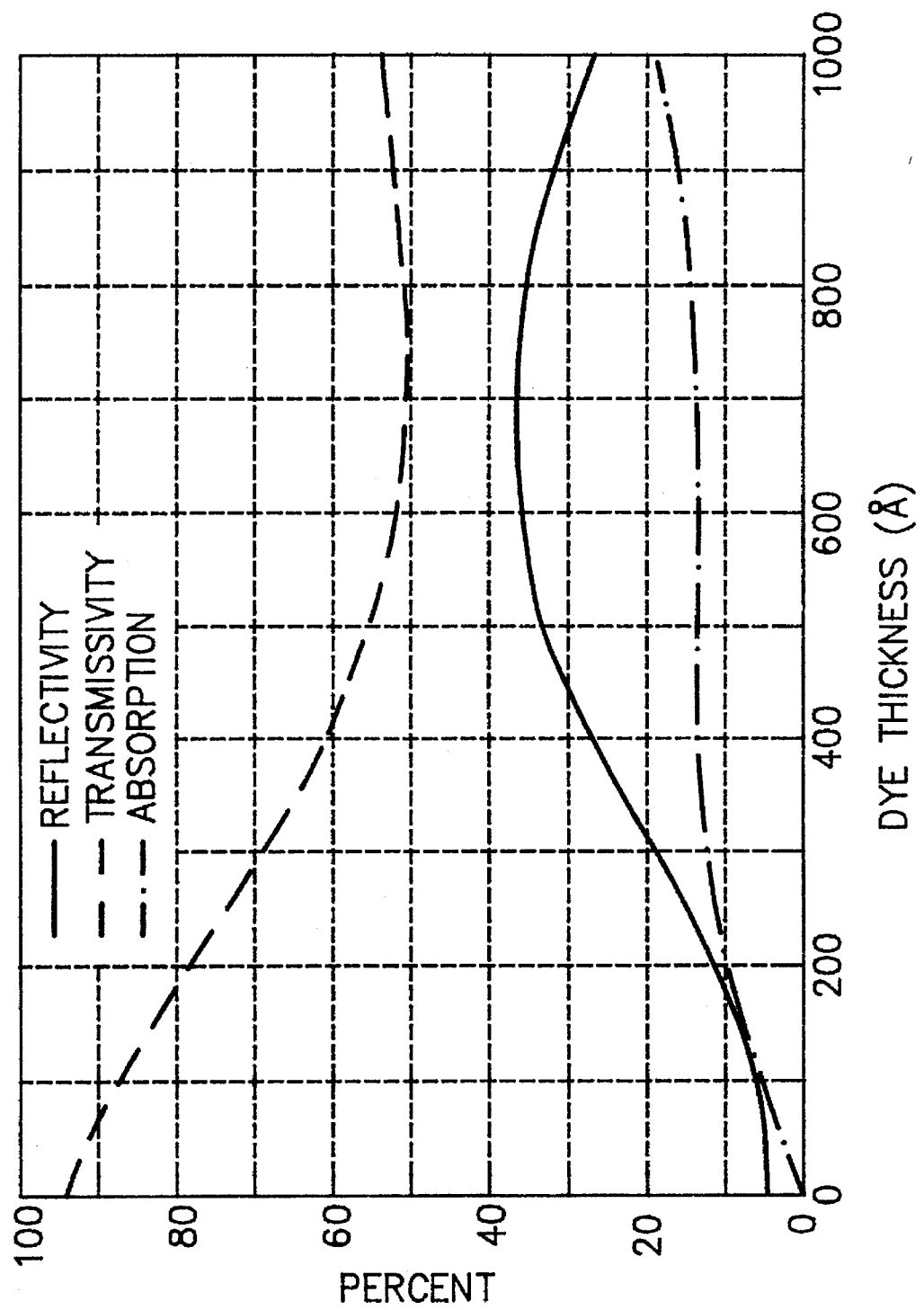
FIG. 8 is a graph of the transmissivity, reflectivity and absorption of a cyanine dye data layer as a function of thickness for a system where n=2.7, k=0.15 and the laser wavelength is 780 nm.

FIG. 7 illustrates a four data layer air-gap structure with a dye material of n-2.7 and k-0.15 at 780 nm wavelength for the first and intermediate data layers. The dye material was made by mixing a highly transmissive (at 780 nm) cyanine dye (dibutyl dibenzo dicarbocyanine perchlorate) with a small percentage of a highly absorbing (at 780 nm) cyanine dye (hexamethylindo tricarbocyanine iodide). This dye material was spin-coated onto substrates 600, 610, 620 to form the first, third and fourth data layers 602, 612, 622. FIG. 8 shows the reflectivity, transmissivity and absorption of this dye material as a function of thickness, where the adjacent spacer material is air (n=1.0). The second data layer is the last or farthest data layer 632 on substrate 630. In this embodiment substrate 600 is 1.2 mm thick polycarbonate and has an outer face 601 onto which the laser beam is incident. Substrates 610, 620 and 630 are 0.06 mm thick polycarbonate. The thicknesses of the first data layer 602 and intermediate data layers 612, 622 were 300 Angstroms, 350 Angstroms and 410 Angstroms, respectively. The second or farthest data layer 632 does not have to be transmissive but only have sufficient reflectivity and absorption. This can be achieved by many types of dyes with appropriate thicknesses. In this embodiment a 500 Angstroms thick cyanine dye with n-2.7 and k=1.8 was used for data layer 632. The four data layers had values of transmissivity, reflectivity and absorption as shown in Table 1 below:

TABLE 1

| Layer Number (See FIG. 7) | Thickness (Angstroms) | Transmissivity (%) | Reflectivity (%) | Absorption (%) |
|---|---|---|---|---|
| 1 (602) | 300 | 68 | 19 | 13 |
| 3 (612) | 350 | 64 | 22 | 14 |
| 4 (622) | 410 | 60 | 26 | 14 |
| 2 (632) | 500 | 15 | 25 | 60 |

Figure 9:
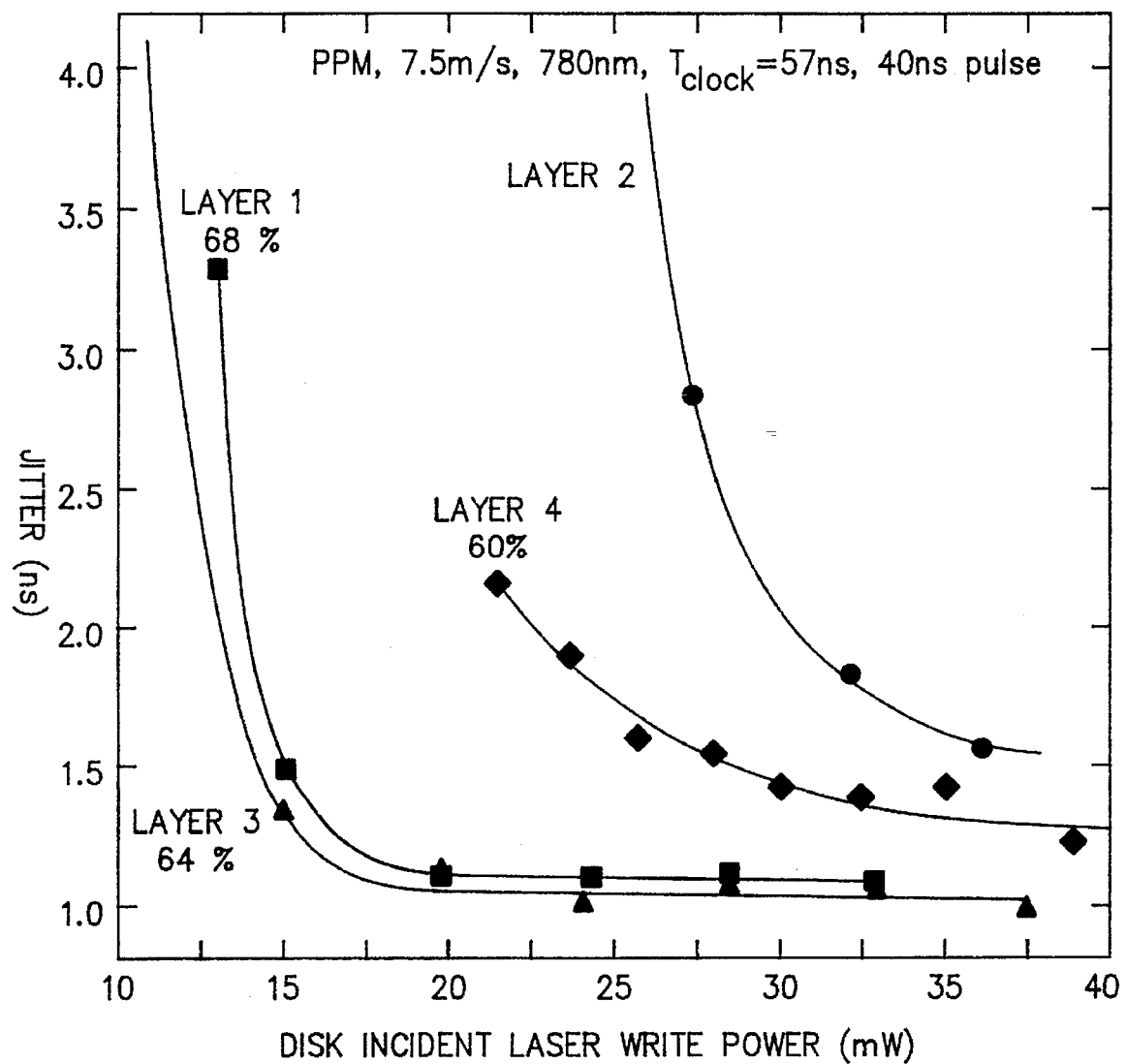
FIG. 9 is a graph of readback data jitter as function of laser write power for each of the data layers in a four data layer dye-based WORM optical disk system according to the present invention.

The four data layer disk described above was tested on a dynamic test stand. A laser beam of 780 nm wavelength was focused through a 0.55 numerical aperture lens. The disk was rotated so that the local media velocity was 7.5 m/s. Laser pulses of 40 ns were used to record pulse position modulation (PPM) data with a 57 ns clock cycle and a (2,7) run-length-limited code. FIG. 9 is a graph of readback data "jitter" for each of the four data layers as a function of laser write power. Jitter is a measure of the deviation of the written mark transitions from their ideal locations on the disk. Low jitter is important to ensure that data is read back with minimal errors. It is desirable to have the worst case jitter be less than five percent of the clock cycle, which would be 2.85 ns in this case of a 57 ns clock. As shown in FIG. 9, the readback data on all four data layers, for data written at a laser power of 32 mW, exhibited low jitter. The worst case readback data jitter was measured to be 1.5 ns for the second or farthest data layer 632, which is less than that required for a commercial disk.

Although an air-gap structure is shown in FIG. 7, disk structures similar to those shown in FIGS. 2B–2D can also be implemented. For example, if a four data layer solid structure similar to that of FIG. 2C is made with UV curable photo-polymer (n=1.5) as the spacer layers, and the same dye materials are used as used for the air gap structure (FIG. 7), the four data layers should have the thicknesses as indicated in Table 2 below. The transmissivity, reflectivity and absorption for the layers are calculated from data similar to that shown in FIG. 8, but for the case where the spacer layer adjacent to the dye material has an index of refraction of 1.5 instead of 1.0 (FIG. 8 is for the air-gap structure).

TABLE 2

| Layer Number | Thickness (Angstroms) | Transmissivity (%) | Reflectivity (%) | Absorption (%) |
|---|---|---|---|---|
| 1 | 560 | 68 | 19 | 13 |
| 3 | 660 | 66 | 21 | 13 |
| 4 | 780 | 65 | 21 | 14 |
| 2 | 600 | 15 | 27 | 58 |

The above description is for a multiple data layer disk with reading and writing done at a single designed laser wavelength. Because laser recording wavelengths will decrease in the future to take advantage of the smaller recording spot size, it may be desirable to design the multiple data layer dye-based WORM disk to be writable at one designated wavelength but readable at multiple wavelengths. This will allow forward compatibility so that prerecorded disks written with optical drives that operated at a higher laser wavelength can still be read with newer drives that operate at a lower laser wavelength. With a single dye material, this objective may be difficult to achieve. For example, from FIG. 5 it can be seen that n decreases rapidly as the wavelength decreases away from the designated wavelength of 780 nm. At 650 nm n is close to 1.5, which is not desirable for readback. To overcome this difficulty, a second dye can be added to the original dye solution before spin-coating. The second dye must not be chemically reactive with the first dye so that each dye retains essentially its own optical properties. This second dye should have the property of peak absorption below 650 nm so its value of n at 650 nm is high (>2.5). Furthermore, it should have an extinction coefficient k near zero at 780 nm so as not to affect the transmission at the intended recording wavelength. Therefore, this mixed dye system should have high n at two readable wavelengths, (e.g., 650 nm and 780 nm) and low k at the recording wavelength of 780 nm. During writing at 780 nm, the heat generated is sufficient to cause decomposition and/or ablation for the first and second dyes and hence a change in n occurs at both 780 nm and 650 nm. This will lead to a change in reflectivity in the written regions and thus readback of the written data can be accomplished.

While the preferred embodiments of the present invention have been illustrated in detail, it should be apparent that modifications and improvements may be made to the invention without departing from the spirit and scope of the invention as described in the following claims.

What is claimed is:

1. An optical disk drive system comprising:

a laser light source for generating laser light at a predetermined wavelength and at different read and write power levels;

an optical disk comprising (a) a first substrate transmissive to the light and having a first surface that forms a disk outer face onto which the light is incident, (b) a first data layer of dye-based write-once material spaced from the disk outer face by the substrate, the dye material in the first data layer exhibiting, at said predetermined wavelength, an index of refraction greater than the index of refraction of the first substrate and an extinction coefficient less than approximately 1.0, the first data layer having a thickness wherein the first data layer's transmissivity to light at said predetermined wavelengh is greater than its reflectivity, and (c) a second data layer of dye-based write-once material spaced from the first data layer, the dye material in the second data layer exhibiting, at said predetermined wavelength, an extinction coefficient greater than approximately 1.0;

a motor attached to the disk for rotating the disk;

a lens located between the laser light source and said first surface of the first substrate for focusing the laser light to a spot; and means connected to the lens for moving the lens relative to the disk so the focused spot can be moved from one data layer to another data layer; whereby the light at the read power level is reflected back from the first data layer when the spot is focused on the first data layer and the light at the write power level is transmitted through the first data layer when the spot is focused on the second data layer.

2. The disk drive system according to claim 1 wherein the optical disk further comprises a solid spacer layer transmissive to the light and located between and separating the first and second data layers by the thickness of said spacer layer.

3. The disk drive system according to claim 2 further comprising a deformable layer of material formed directly on and in contact with the dye material of the first data layer and located between the first data layer and the solid spacer layer for permitting deformation of the first data layer when the spot at the write power level is focused on the first data layer.

4. The disk drive system according to claim 2 wherein the second data layer is formed on the spacer layer.

5. The disk drive system according to claim 2 wherein the spacer layer comprises a photo-polymer material.

6. The disk drive system according to claim 1 wherein the optical disk further comprises a second substrate and wherein the second data layer is formed on the second substrate and the first and second substrates are spaced apart by an air-gap.

7. The disk drive system according to claim 1 wherein the optical disk further comprises a disk blank, a ring attached to and extending around the outer perimeter of the disk blank, and a solid spacer layer transmissive to the light and located between and separating the first and second data layers, wherein the substrate is a plastic dust cover supported by the ring and wherein the first data layer and the plastic dust cover are separated by an air-gap.

8. The disk drive system according to claim 1 further comprising a protective layer of material selected from the group consisting of $SiN_x$, ZnS, $ZrO_x$, $SiO_2$ and photo-polymers formed on the first and second data layers.

9. The disk drive system according to claim 1 wherein the dye material in the first and second data layers is selected from one or more in the group consisting of cyanines, squaryliums, phthalocyanines, azomethines, merocyanines, anthraquinones and phenylenediamine metal complexes.

10. The disk drive system according to claim 9 wherein the dye material in the first and second data layers is substantially the same dye material.

11. The disk drive system according to claim 9 wherein the dye material in the first data layer comprises a phthalocyanine dye.

12. The disk drive system according to claim 9 wherein the dye material in the first and second data layers comprises a cyanine dye.

13. The disk drive system according to claim 12 wherein the cyanine dye material in the first and second data layers comprises copper phthalocyanine tetracarboxamide.

14. The disk drive system according to claim 12 wherein the cyanine dye material in the first and second data layers comprises dibutyl dibenzo dicarbocyanine perchlorate.

15. The disk drive system according to claim 1 wherein the optical disk further comprises a third data layer of dye-based write-once material located between the first and second data layers and exhibiting, at said predetermined wavelength, an index of refraction greater than the index of refraction of the first substrate and an extinction coefficient less than approximately 1.0, whereby the light at the write power level is transmitted through the third data layer when the spot is focused on the second data layer.

16. A multiple data layer write-once optical disk comprising:

a first substrate transmissive to laser light at a predetermined wavelength and having a first surface that forms a disk outer face for receipt of incident laser light at said predetermined wavelength;

a first data layer of dye-based write-once material spaced from the disk outer face by the first substrate, the dye material in the first data layer exhibiting, at said predetermined wavelength, an index of refraction greater than the index of refraction of the first substrate and an extinction coefficient less than approximately 1.0, the first data layer having a thickness wherein the first data layer's transmissivity to light at said predetermined wavelength is greater than its reflectivity; and a second data layer of dye-based write-once material spaced from the first data layer, the dye material in the second data layer exhibiting, at said predetermined wavelength, an extinction coefficient greater than approximately 1.0.

17. The optical disk according to claim 16 further comprising a solid spacer layer transmissive to light at the predetermined wavelength and located between and separating the first and second data layers by the thickness of said spacer layer.

18. The optical disk according to claim 17 further comprising a deformable layer of material formed directly on and in contact with the dye material of the first data layer and located between the first data layer and the solid spacer layer for permitting deformation of the first data layer when the spot at the write power level is focused on the first data layer.

19. The optical disk according to claim 17 wherein the second data layer is formed on the spacer layer.

20. The optical disk according to claim 17 wherein the spacer layer comprises a photo-polymer material.

21. The optical disk according to claim 16 further comprising a second substrate and wherein the second data layer is formed on the second substrate and the first and second substrates are spaced apart by an air-gap.

22. The optical disk according to claim 16 further comprising a disk blank, a ring attached to and extending around the outer perimeter of the disk blank, and a solid spacer layer transmissive to the light and located between and separating the first and second data layers, wherein the first substrate is a plastic dust cover supported by the ring and wherein the first data layer and the plastic dust cover are separated by an air-gap.

23. The optical disk according to claim 16 further comprising a protective layer of material selected from the group consisting of $SiN_x$, ZnS, $ZrO_x$, $SiO_2$ and photo-polymers formed on the first and second data layers.

24. The optical disk according to claim 16 wherein the dye material in the first and second data layers is selected from one or more in the group consisting of cyanines, squaryliums, phthalocyanines, azomethines, merocyanines, anthraquinones and phenylenediamine metal complexes.

25. The optical disk according to claim 24 wherein the dye material in the first and second data layers is substantially the same dye material.

26. The optical disk according to claim 24 wherein the dye material in the first data layer comprises a phthalocyanine dye.

27. The optical disk according to claim 24 wherein the dye material in the first and second data layers comprises a cyanine dye.

28. The optical disk according to claim 27 wherein the cyanine dye material in the first and second data layers comprises copper phthalocyanine tetracarboxamide.

29. The optical disk according to claim 27 wherein the cyanine dye material in the first and second data layers comprises dibutyl dibenzo dicarbocyanine perchlorate.

30. The optical disk according to claim 16 further comprising a third data layer of dye-based write-once material located between the first and second data layers and exhibiting, at said predetermined wavelength, an index of refraction greater than the index of refraction of the first substrate and an extinction coefficient less than approximately 1.0.

31. The optical disk according to claim 16 further comprising a chemical buffer layer selected from one or more in the group consisting of nitrides, oxides, carbides, and sulfides and formed between the first data layer and the first substrate.

* * * * *